Aug. 1, 1939.  H. O. STEPHENS  2,168,177
SYSTEM OF DISTRIBUTION
Filed Nov. 8, 1938  2 Sheets—Sheet 1
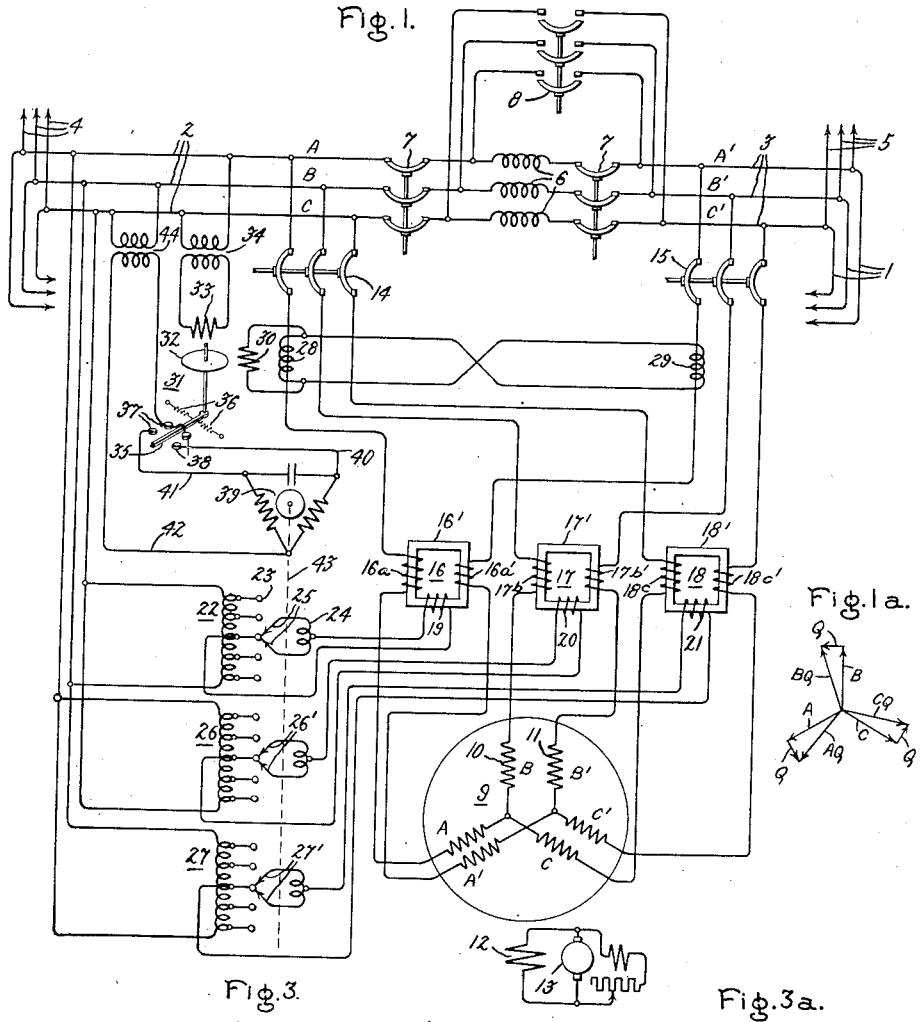
Fig. 1.
Fig. 1a.
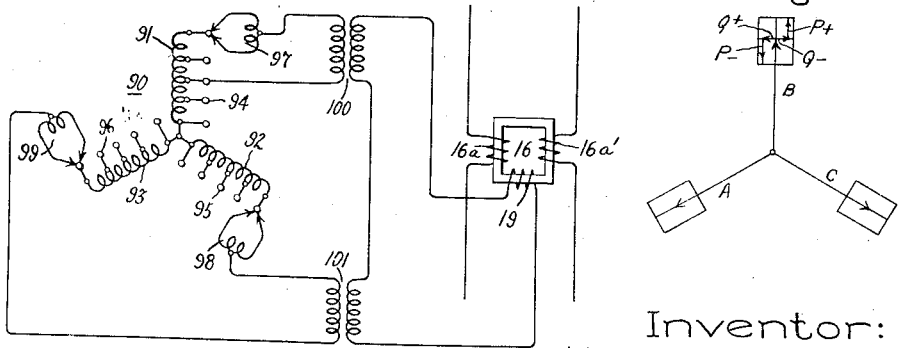
Fig. 3.
Fig. 3a.
Inventor:
Howard O. Stephens,
by Harry E. Dunham
His Attorney.

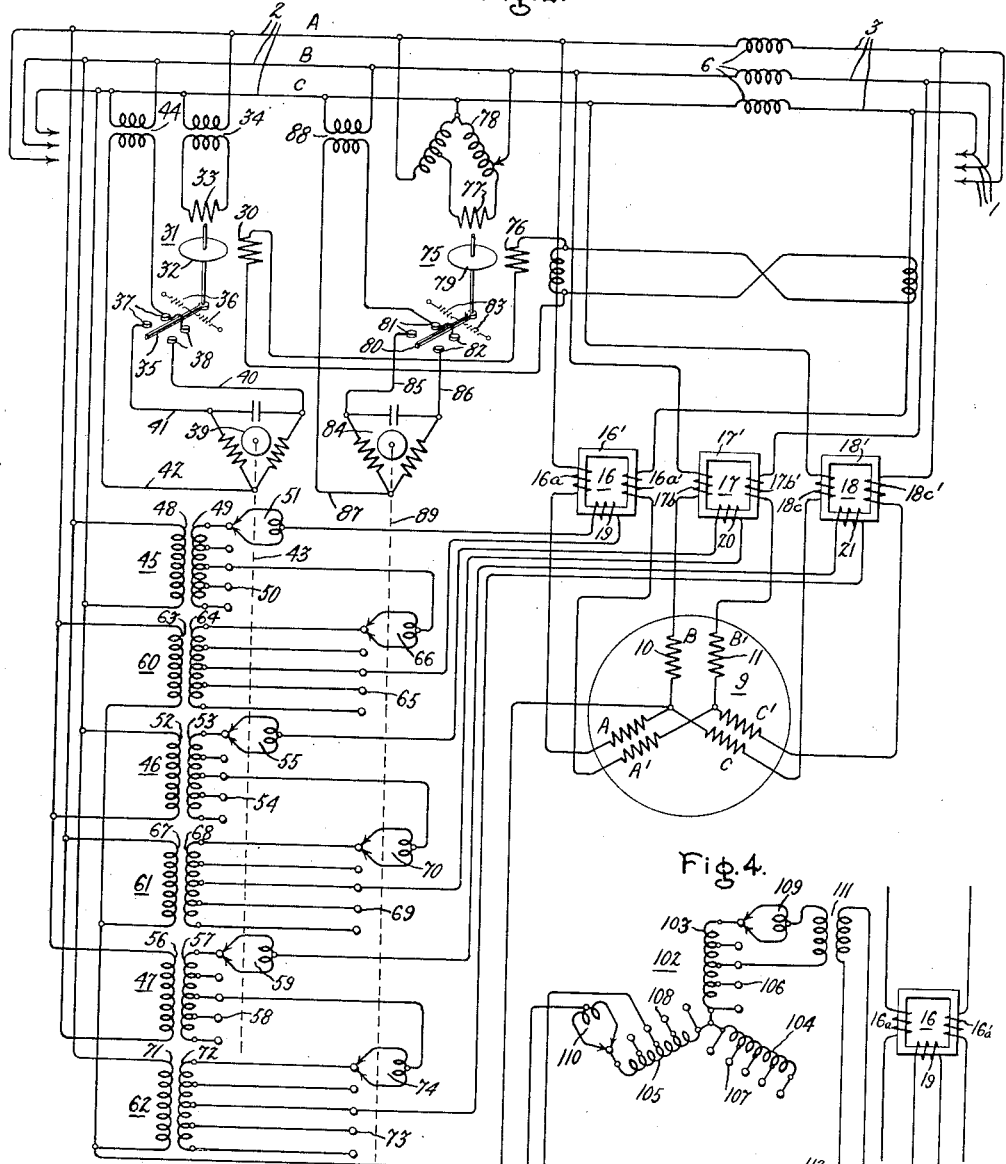
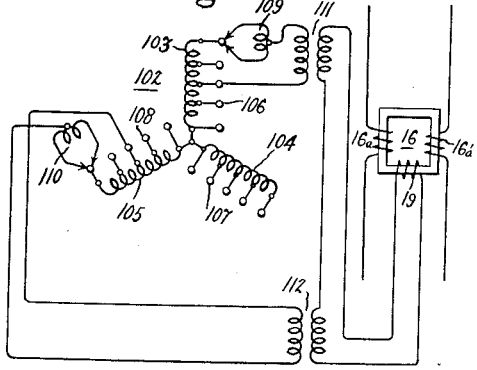
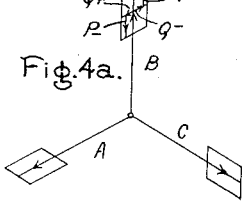
Fig. 2.
Fig. 4.
Fig. 4a.
Inventor:
Howard O. Stephens,
by Harry E. Dunham
His Attorney.

Patented Aug. 1, 1939

2,168,177

UNITED STATES PATENT OFFICE 2,168,177

SYSTEM OF DISTRIBUTION

Howard O. Stephens, Pittsfield, Mass., assignor to General Electric Company, a corporation of New York Application November 8, 1938, Serial No. 239,485

16 Claims. (Cl. 171—119)

My invention relates to systems of electrical distribution and more particularly to busbar systems and systems of connections for central generating stations and substations of alternating current distribution systems.

During the past ten years a number of large turbo-generators equipped with double armature windings have been installed in central stations in order to reduce the magnitude of short-circuit currents and also to reduce the duty on circuit breakers. It is common practice to connect such generators in a sectionalized ring bus with one armature winding connected to one bus section and the other winding connected to a different bus section. There are, of course, various feeders connected to each bus section and unless the double winding generator performs the function of a bus sectionalizing reactor, reactors are placed between each bus section. In any event, if the load is evenly distributed around the bus, little or no current will flow through the bus sectionalizing reactors or equivalent bus reactor, and the current from the two armature windings will be substantially equal. If the load is not evenly distributed, there may be a material difference in voltage or phase angle between the voltages of different bus sections so that the load taken from the two windings of a double-winding generator may be unequal. It is desirable, unless the double-winding generator is specially designed to operate with a given degree of unbalance, that these loads be maintained as nearly equal as possible to get full load from a generator without excessive heating.

It has been proposed heretofore to use a balancing transformer between the corresponding phase conductors of each winding of the double-winding generator. Such a transformer is automatic in its action and will always tend to keep the currents in the two windings of the generator balanced. It has, however, one serious defect for which compensation must be provided. If one of the generator circuit breakers should open, dangerous voltages may develop in the circuit with peak values such as to jeopardize the circuit breaker operation. Furthermore, objectionable harmonic voltage will be developed by the balancing transformers which will appear in both circuits of the double winding generator. Nonlinear resistors have been proposed for use across such balancing transformers in order to provide protection against objectionable voltages. However, when it is necessary to operate continuously with one circuit open, it is necessary to provide a short circuiting switch for the balancing transformer or design the protective resistors for continuous operation, in which case they will be very large and expensive. Other means have been proposed for maintaining a balanced current condition between the respective windings of a double winding generator wherein tap-changing transforming means are provided for changing the voltage relation of one winding with respect to the other. However, such arrangements of voltage modification as have been proposed can only effect the exchange of wattless current, whereas it is usually much more important to control the division of power.

It is an object of my invention, therefore, to provide an improved system of distribution which will overcome the above mentioned disadvantages of the arrangements of the prior art.

It is another object of my invention to provide an improved arrangement for maintaining a balanced current condition between the windings of a double-winding or multiple-winding generator or a plurality of separate generators wherein the respective windings are connected to a bus or distribution circuits in such a manner as to be subjected to differences in phase or magnitude between the voltages of the respective windings or generators under different load conditions.

It is a further and more specific object of my invention to provide an improved arrangement for maintaining a balanced current condition between the two windings of a double-winding generator connected to a sectionalized bus under all conditions of loading on the bus.

In accordance with one embodiment of my invention, I utilize a balancing transformer between corresponding phase windings of a double-winding generator, and by means of load ratio control equipment provide a quadrature voltage control which is used to control the division of power current in the two windings of a double-winding generator connected to a sectionalized bus. In accordance with another embodiment of my invention, I provide both in-phase and quadrature voltage control through the balancing transformer so as to control simultaneously both wattless current and power current division.

The novel features which I believe to be characteristic of my invention are set forth with particularity in the appended claims; the invention itself, however, both as to organization and method of operation, together with further objects and advantages thereof, will be better understood by reference to the following description taken in connection with the accompanying drawings in which Fig. 1 is a diagrammatic illustration of one embodiment of my invention for controlling the division of power current between the respective windings of a double-winding generator connected to a sectionalized bus; Fig. 1a is a voltage sector diagram for explaining the operation of the embodiment of Fig. 1; Fig. 2 is a modification of the arrangement shown in Fig. 1 for obtaining control simultaneously of both wattless current and power current division; Fig. 3 is a diagrammatic illustration of a transformer connection detail of the embodiment illustrated in Fig. 2 for obtaining simultaneous wattless and power current division with a polyphase autotransformer instead of two separate transformers for each phase; Fig. 3a is an explanatory diagram illustrative of the control voltages that may be obtained with the arrangement of Fig. 3; Fig. 4 shows a modification of the arrangement shown in Fig. 3, and Fig. 4a is an explanatory diagram illustrative of the control voltages that may be obtained with the connections as in Fig. 4.

Referring to Fig. 1 of the drawings, 1 indicates a portion of a power station bus which may be of the ring type as indicated or any of the other known types in a single or duplicate busbar system. The bus 1 may comprise any desired number of sections but for purposes of simplicity in illustration, I have shown only two sections designated as 2 and 3. A number of feeder circuits may be arranged to be supplied from each bus section and, by way of example, single feeder circuits 4 and 5 are shown connected to bus sections 2 and 3, respectively. In this instance, the power transfer along the bus is obtained by means of a bus reactor and the bus sections 2 and 3 have interposed therebetween a reactor 6 with a switch 7 on each side thereof and a by-pass switch 8, all in accordance with the well known practice. Under the usual conditions of operation, switches 7 are maintained in a circuit closing position and switch 8 is maintained in a circuit interrupting position.

A multiple winding generator 9 having a plurality of separately insulated armature circuits is connected to energize the bus 1 in such a manner that each separately insulated circuit of the same generator is connected to a different bus section. Any number of generators, either of the double-winding or single-winding type, may be connected to energize the bus 1, but for the purpose of illustrating my invention I have shown the generator 9 as a double-winding generator. As shown, generator 9 comprises two separately insulated three-phase stator windings 10 and 11 and an excitation winding 12 which is connected to be energized and controlled by any suitable means such as the usual form of controllable exciter 13. The winding 10 is connected to the bus section 2 through a so-called generator switch 14 and similarly winding 11 is connected to bus section 3 through a generator switch 15. The generator switches may be of the usual type of oil switch and are provided in accordance with the standard practice to interrupt the circuit through the generator winding associated therewith upon the occasion of a fault or short circuit, or to isolate a particular generator winding or generator whenever it is found desirable or necessary. Some of the other standard elements usually utilized in such a system and which would ordinarily be used have not been shown since such element, or elements, are not deemed necessary for an understanding of my invention.

Balancing transformers 16, 17 and 18 are connected between corresponding phases of the generator windings 10 and 11. Thus balancing transformer 16 is provided with a core 16' having wound thereon a winding 16a which is connected in series relation with phase A conductor of generator winding 10 and winding 16a' which is connected in series relation with the phase A' conductor of generator winding 11. The windings 16a and 16a' are preferably placed in inductive relation with high mutual coupling and so arranged that for a predetermined ratio or division of current and a common power factor between the two generator windings, the magneto-motive force of one of the transformer windings will be equal and opposite to the magneto-motive force of the other transformer winding. In like manner, transformer 17 is provided with a core 17' and windings 17b and 17b' connected in series, respectively, with the phase B and phase B' conductors of generator windings 10 and 11, and transformer 18 is provided with a core 18' and windings 18c and 18c' connected in series, respectively, with the phase C and phase C' conductors of generator windings 10 and 11.

The arrangement thus far described is known in the art and the inherent operation of the balancing transformer to introduce automatically a component of voltage in the proper direction in the circuit of lower current, thereby to effect a balanced condition, is also known. However, this arrangement, as previously noted, has serious defects in regard to over-voltages and the generation of objectionable harmonic voltages due to the varying permeability of the transformer core.

In accordance with my invention as illustrated in Fig. 1, I provide separate excitation for the balancing transformer through load ratio control equipment, or connections which may be changed under load, so as to introduce components of voltage in the respective generator circuits in such a direction and phase angle relative to the generator voltage as to control the division of power or power current in contradistinction to controlling the division of reactive power or wattless current. The control which I provide is analogous to turbine throttle control between a plurality of single-winding generators to effect power current control as contrasted with generator field control to effect wattless current control in the same system. Hence, in accordance with this embodiment of my invention, the control voltages are introduced in quadrature with the generator phase voltages rather than in phase. A suitable means for carrying my invention into effect comprises what may be generally referred to as a quadrature load ratio control transformer supplying excitation to the balancing transformers. As illustrated, the balancing transformers 16, 17 and 18 are provided, respectively, with additional exciting windings 19, 20 and 21. The winding 19 of transformer 16, which is connected in the A phase, is connected to be energized through a transformer 22 which, as illustrated, may be an auto-transformer provided with taps 23. One terminal of the winding 19 is permanently connected to the midpoint of the transformer 22 and the other terminal is arranged for adjustable connection to a tap or taps 23 through a so-called preventive reactor 24 and movable ratio adjusters 25 which are shown in the neutral position. In order to obtain quadrature voltage control, the transformer 22 is connected across that phase of the bus 2 as will provide a voltage in quadrature with the voltage in which the balancing transformer is connected. With the assumed designation of phases as A, B and C of the bus and generator in Y-connection, the transformer 22 is connected across the bus phase conductors BC for transformer 16 which is connected in the A phase conductor of winding 10 and the corresponding phase or A' phase conductor of winding 11. In like manner, the winding 20 of balancing transformer 17 is connected to be energized from a similar load ratio control transformer 26 through ratio adjusters 26'. In this case, the balancing transformer 17 is connected in the B and B' phase conductors and the transformer 26 is connected to be energized across the bus phase conductors AC. The winding 21 of balancing transformer 18 is connected to be energized from the load ratio control transformer 27 through ratio adjusters 27' and is connected to be energized across the bus phase conductors AB. It will occur to those skilled in the art that in view of the wide variety of mechanical methods and the large number of special connections that have been evolved in connection with load ratio control apparatus, many other forms of such apparatus could be used without departing from my invention in its broader aspects and that the form shown is only illustrative of the underlying principle of all such devices.

The connections above described provide a component of control voltage in quadrature with the voltage of the generator phase in which the balancing transformer is connected. It will be apparent to those skilled in the art, in view of the arrangement just described, that by suitable connections of the load ratio control transformer 120° and 60° phase displacements in the component of control voltage may be obtained if the type of control obtained thereby is desired.

In order to provide for automatic control of the current division, I provide means automatically operative in response to the departure from a given power current division or ratio to operate the ratio adjusters of the load ratio control equipment to vary the component of quadrature control voltage. One type of control comprises two current transformers 28 and 29 which are differentially connected to energize a winding 30 so that if the currents in the respective phase conductors associated with the current transformers are balanced or in a predetermined ratio, no current flows in the winding 30 whereas if the currents are unbalanced or depart from the desired ratio a resultant current will flow in the winding 30 in accordance with the amount of the departure. The energization of the winding 30 alone only indicates by magnitude and direction the degree of unbalance and the relative loading of the two generator windings. In order to obtain an indication of balance as regards both magnitude and phase angle of the respective generator windings, I employ a relay 31 of the power directional form and of the well known induction type. The relay 31 may comprise a closed circuit member or conducting disk 32 which is pivoted and forms the moving element of the relay. The energizing elements for the relay comprise the current coil 30 and a coil 33 which is connected to a suitable voltage of such phase as to provide the relay with maximum torque at unity power factor for quadrature load ratio control equipment utilized to effect power current balance. A commercial form of a suitable form of power directional relay has a power factor of substantially 0.5 so that the current of the voltage coil lags the voltage by substantially 60°. Hence under these conditions the voltage coil 33 may be connected to phase conductors AC through a transformer 34, thereby giving the relay maximum torque at unity power factor of the generator current. A contact arm 35 is secured to the movable element 32 and is biased to a neutral or balanced position by a suitable means such as the springs 36. The contact arm 35 is arranged to close selectively either of two pairs of contacts 37 and 38. The contacts 37 and 38 are arranged in the energizing circuit of a device for operating the ratio adjusters and as illustrated may be a motor 39 of the capacitor type. The motor 39 as illustrated is reversible with two direction controlling conductors 40 and 41 and a return conductor 42. The motor 39 is arranged to operate the ratio adjusters 25, 26' and 27' through a suitable connection indicated by the dotted line 43. The return conductor 42 is connected to one side of the secondary winding of a transformer 44 while the conductors 40 and 41 are arranged to be selectively connected to the other side of the secondary winding 44 through contacts 37 or 38 in accordance with the operation of the relay 31.

The operation of the embodiment of my invention illustrated in Fig. 1 is substantially as follows: The various switches will be assumed to be in the positions indicated and it will also be assumed that the generator 9 is supplying energy to the bus 1 with a predetermined ratio between the power currents which, by way of illustration, will be assumed to be a balanced power current condition. Under the assumed conditions, the relay 31 would assume its illustrated neutral position and the ratio adjusters would be in a neutral position or such position that no quadrature component of voltage is introduced into the generator circuit. Assume that the power current division between windings 10 and 11 departs from the balanced condition and that winding 10 has the lower current or lighter load. A current will then flow in winding 30 of relay 31 in proportion to the difference in magnitude of the currents in the two generator windings 10 and 11. The relay 31 is then actuated to close either contacts 38 or 37 so as to operate motor 39 and thereby the ratio adjusters 25, 26' and 27' in such a direction as to, in effect, advance the phase of the voltage of winding 10 (the lighter loaded winding) at the bus relative to the terminal voltage at the machine, and retard the phase of winding 11 (the heavier loaded winding). The manner in which the phase of the voltage at the bus is shifted relative to the terminal voltage at the machine may be readily understood by an examination of Fig. 1a. In this diagram the vectors A, B and C represent the three phase voltages at the machine terminals. The vectors Q in quadrature to the terminal voltages represent the quadrature voltage control component introduced in the generator voltage circuit. The resultant vectors AQ, BQ and CQ represent the voltages at the bus. In accordance with the usual convention of indicating an advance in phase by a counterclockwise rotation, it will be observed that the resultant voltages at the bus have been advanced in phase. Obviously, if the quadrature vectors Q were in the opposite direction from that shown, the resultant vectors AQ, BQ and CQ would have been retarded in phase relative to the vectors A, B and C.

In Fig. 2 I have shown an embodiment of my invention in the same general system as that show in Fig. 1, but in this arrangement I provide energization for the balancing transformers such that control of the division of wattless current and power current can be obtained simultaneously. The elements of this embodiment corresponding to those in Fig. 1 have been assigned like reference numerals. However, some of the conventional switches, feeder circuits and elements of like character shown in Fig. 1, which would be used in a commercial system in carrying my invention into effect, have been omitted in order to keep the drawings as simple as possible for an easy understanding of my invention. The additional features of this embodiment over that of Fig. 1 comprise the combination of load ratio control transformers for obtaining simultaneously both in-phase and quadrature control with a resultant control voltage introduced into the generator circuits and means for obtaining this control automatically. The transformers 45, 46 and 47 correspond to the auto-transformers 22, 26 and 27 of Fig. 1 for providing the quadrature control component of voltage. In this instance I have shown each of the transformers 45, 46 and 47 with a primary winding and a tapped secondary winding in order to obviate the use of series transformers between the load ratio control transformers and the windings of the balancing transformers. Thus, transformer 45 comprises a primary winding 48 and a tapped secondary winding 49 having taps 50 and a ratio adjuster 51 cooperating therewith. Transformer 46 likewise comprises a primary winding 52, a tapped secondary winding 53, taps 54 and a ratio adjuster 55 cooperating therewith. Transformer 47 likewise comprises a primary winding 56, a tapped secondary winding 57, taps 58 and a ratio adjuster 59 cooperating therewith. The primary windings 48, 52 and 56 are connected to be energized from phase conductors BC, AC and AB, respectively. The ratio adjusters 51, 55 and 59 are operated by the relay 31, as in Fig. 1, through a suitable connection indicated by the dotted line 43.

The in-phase voltage control component is provided by load ratio control transformers 60, 61 and 62. The transformer 60 comprises a primary winding 63, a tapped secondary winding 64, taps 65, and a ratio adjuster 66. The primary winding 63 is connected to be energized in accordance with the phase voltage of its associated balancing transformer and hence may be connected across the A phase of the bus 1 and the neutral of generator winding 10. The midtap of the quadrature control transformer secondary winding 49 is connected in series relation with the secondary winding 64 of the in-phase control transformer 60 through the ratio adjuster 66. One terminal of the exciting coil 19 of the balancing transformer 16 in the A phase is connected through ratio adjuster 51 to the quadrature control secondary winding 49 and the other terminal thereof is connected to the midtap of the in-phase control secondary winding 64. Briefly stated in general terms, the secondary tap windings of the in-phase and quadrature control transformers are connected in series and across the exciting winding of the balancing transformer so that the desired voltage and phase angle may be impressed on the balancing transformer. In like manner, the in-phase control transformer 61 comprises a primary winding 67, a tapped secondary winding 68, taps 69 and a ratio adjuster 70. The transformer primary winding 67 is connected to be energized across the B phase conductor and the neutral of generator winding 10. The transformer secondary windings 53 and 68 are connected in series relation and across the exciting winding 20 of balancing transformer 17 in the B phase through ratio adjusters 55 and 70. The in-phase control transformer 62 comprises a primary winding 71, a tapped secondary winding 72, taps 73 and a ratio adjuster 74. The primary winding 71 is connected to be energized across the C phase conductor of bus 1 and the neutral of generator winding 10. The transformer secondary windings 57 and 72 are connected in series relation and across the exciting winding 21 of the balancing transformer 18 in the C phase through ratio adjusters 59 and 74.

In order to control the ratio adjusters of the in-phase control transformers 60, 61 and 62, I may utilize a relay 75 and control apparatus similar to relay 31, except that relay 75 is arranged to have a maximum torque at zero power factor. The relay 75 comprises a winding 76 connected in series relation with the winding 30 of relay 31 so as to be energized in accordance with the current difference between the generator windings. The relay is also provided with a voltage winding 77. The winding 77 may be connected in various ways to the several voltages of the bus to provide for maximum torque of the relay at zero power factor, but a convenient way is to use the commercial form of double auto-transformer 78 as illustrated. The relay 75 being of the induction type is provided with a closed circuited member or conducting pivoted disk 79 provided with a contact member 80 which is arranged to selectively close either of two pairs of contacts 81 and 82. The contact member 80 is biased to a neutral or balanced position by any suitable means indicated as springs 83.

The operating means for the ratio adjusters 66, 70 and 74 may be similar to the means illustrated in Fig. 1 and as shown comprises a single-phase capacitor motor having two direction control conductors 85 and 86 and a common return conductor 87. The motor 84 is arranged to be energized from bus 1 through a transformer 88 having one side of its secondary winding connected to the common return conductor 87 and the other side arranged for connection to the conductor 85 through the pair of contacts 81 and to the conductor 86 through the pair of contacts 82. The ratio adjusters are arranged for operation through a suitable connection to the rotating element of motor 84 and indicated by the dotted line 89.

The operation of the arrangement illustrated in Fig. 2 is quite similar to that described in connection with the arrangement illustrated in Fig. 1. In this arrangement, however, the control voltage introduced through the balancing transformers 16, 17 and 18 is a component of voltage which is a resultant of a quadrature component and an in-phase component. This operation may be more clearly understood by reference to the vector diagram of Fig. 3a. For example, if the vector B represents the phase voltage of one of the armature windings then the vector Q may be taken to represent the quadrature component of control voltage and the vector P the in-phase component of control voltage. The plus and minus signs are used to indicate the direction of these control voltage components; thus when the in-phase component is in the same direction as the phase voltage of the machine it is indicated P+, and when in opposition thereto it is indicated P−. Similarly, when the quadrature component is in a direction to advance the phase of the resultant voltage it is indicated Q+ and when it is in a direction to retard the phase it is indicated Q—. It will be apparent that a resultant control voltage may be obtained anywhere within the confines of the rectangle so that division of both the power current and wattless current may be controlled simultaneously.

In Fig. 3 I have shown an arrangement for carrying my invention, as embodied in Fig. 2, into effect with a three-phase transformer instead of with single-phase transformers. I have shown a three-phase Y-connected auto-transformer 90 having the respective phase windings 91, 92 and 93 provided with the taps in each phase winding designated 94, 95 and 96, respectively, and the ratio adjusters 97, 98 and 99 associated, respectively, with taps 94, 95 and 96. Two transformers 100 and 101 are arranged with their secondary windings in series relation to energize the exciting winding of the balancing transformer such as coil 19 of balancing transformer 16. The primary winding of transformer 100 is connected to be energized from the midtap of the tapped section 91 through the ratio adjuster 97. The primary winding of transformer 101 is connected to be energized across the tapped sections 92 and 93 through the ratio adjusters 98 and 99. Thus a resultant of a quadrature component of control voltage and an in-phase component of control voltage are introduced into the balancing transformer through winding 19. I have indicated the tap connections to give in-phase and quadrature control in one phase only, since it is believed that this modification and its application to a complete system as in Fig. 2 will be fully understood by those skilled in the art. The other phases would have to be symmetrically connected. This arrangement requires separate series transformers 100 and 101 with three ratio adjusters for each balancing transformer so that for a three-phase system nine ratio adjusters would be required for the three-phase auto-transformer. With this arrangement the vector diagram of Fig. 3a shows that any control voltage may be obtained within the confines of the rectangle as explained in connection with Fig. 2.

In Fig. 4 I have shown a further modification of the load ratio control equipment if it is desired to use poly-phase auto-transformers instead of the two single-phase transformers per phase as shown in Fig. 2. The arrangement of Fig. 4 is somewhat similar to the modification shown in Fig. 3 and shows how the three-phase auto-transformer may be used with somewhat simpler tap-changing equipment, namely, a reduction from nine to six ratio adjusters. I have again shown the tap-connections to give in-phase and quadrature control in one phase only, since it is believed this modification and its application to a complete system will be fully understood by those skilled in the art. A three-phase Y-connected auto-transformer 102 comprises phase windings 103, 104 and 105 which are provided with taps 106, 107 and 108, respectively, and ratio adjusters 109 and 110 associated, respectively, with the taps 106 and 108. Two transformers 111 and 112 are arranged with the secondary windings in series relation to energize the exciting winding of the balancing transformer, such as coil 19 of balancing transformer 16. The primary winding of transformer 111 is connected to be energized across the transformer phase winding 103 through its midtap connection and ratio adjuster 109. The primary winding of transformer 112 is connected to be energized across the transformer phase winding 105 through its midtap connection and the ratio adjuster 110. Fig. 4a shows that any control voltage within the confines of the parallelograms may be obtained and although the range of control is not as great as though provided by the arrangement of Fig. 3 it is simpler and a more desirable arrangement where the range in voltage control and phase angle is sufficient.

Although my invention has been described with particular reference to double-winding generators, it will be apparent from the foregoing disclosure that the same scheme of connections may be used for controlling the division of current between two separate generators. The generator circuits or windings referred to which are not restricted to a common field are intended to include separate generators as well as multiple winding generators with a common field. The application of my invention to separate generators is not so important where the control of power current can be controlled by throttle control, and the control of wattless current can be controlled by field control. However, one important application is where separate generators are driven by compound turbines. In this case, separate throttle control is difficult and the load ratio control system as above described may be used to control the division of power current alone, or both power current and wattless current, thereby giving the ability to adjust the current between the two generators to give minimum losses and maximum output and to take best advantage of the power available for driving the two generators from the respective halves of the compound turbine.

While I have shown and described particular embodiments of my invention, it will occur to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In combination, a pair of alternating current circuits, inductive means for interconnecting said circuits having two windings with opposed magnetomotive forces connected respectively in different circuits of said pair of circuits, and means connected to said inductive means for introducing in each of said pair of circuits a component of voltage which is displaced in phase from the voltage of each of said pair of circuits.

2. In combination, a pair of alternating current circuits, inductive means for interconnecting said circuits having a core and two windings thereon with opposed magnetomotive forces and connected respectively in different circuits of said pair of circuits, an additional winding on said core, and means for energizing said additional winding so as to produce in each circuit of said pair of circuits a component of voltage in quadrature with the voltage of each of said pair of circuits.

3. In combination, a pair of alternating current circuits, inductive means for interconnecting said circuits having two windings with opposed magnetomotive forces connected respectively in different circuits of said pair of circuits, and means connected to said inductive means for introducing in each pair of circuits components of voltage respectively in-phase and in quadrature with the voltage of each of said pair of circuits.

4. In combination, a pair of alternating current circuits, inductive means for interconnecting said circuits having a core and two windings thereon with opposed magnetomotive forces and connected respectively in different circuits of said pair of circuits, an additional winding on said core, and means for energizing said additional winding so as to produce in each circuit of said pair of circuits components of voltage respectively in-phase and in quadrature with the voltage of each of said pair of circuits.

5. In combination, a pair of alternating current generator windings, a pair of electric circuits each connected to be energized from a different generator winding, inductive means coupling said generator windings for maintaining a predetermined ratio between the currents in said windings, and means responsive to a departure from said predetermined ratio of currents for introducing in each generator winding a component of voltage displaced in phase from the voltage of each generator winding.

6. In combination, a pair of alternating current generator windings, a pair of electric circuits each connected to be energized from a different generator winding, inductive means coupling said generator windings for maintaining a predetermined ratio between the currents in said windings, and means responsive to a departure from said predetermined ratio of currents for introducing in each generator winding components of voltage respectively in-phase and in quadrature with the voltage of each generator winding.

7. In combination, a pair of alternating current generator windings, a pair of electric circuits each connected to be energized from a different generator winding, a balancing transformer coupling said generator windings and comprising a core and a pair of windings each connected in a corresponding phase conductor of different generator windings, an additional winding on said core, and means responsive to a departure of the power currents in said generator windings from a predetermined ratio for energizing said additional winding with a voltage in quadrature with the voltage of the generator windings associated with said balancing transformer.

8. In combination, a pair of alternating current generator windings, a pair of electric circuits each connected to be energized from a different generator winding, a balancing transformer coupling said generator windings and comprising a core and a pair of windings each connected in a corresponding phase conductor of different generator windings, an additional winding on said core, and means responsive to the departure of the power currents and wattless currents in said generator windings from a predetermined ratio for energizing said additional winding with components of voltage respectively in-phase and in quadrature with the voltage of the generator windings associated with said balancing transformer.

9. In combination, a plurality of alternating current generator circuits, a load circuit, means including an impedance interconnecting said generator circuits in parallel relation to energize said load circuit, current transforming means interconnecting conductors of corresponding phase of said generator circuits and having windings tending to balance the currents in the respective generator circuits, means comprising an adjustable transformer for supplying excitation current to said current transforming means, said adjustable transformer being connected to be energized so as to produce a voltage component in quadrature with the voltage of the armature conductors associated with said current transforming means, and means for adjusting said adjustable transformer to supply excitation current to said current transforming means to maintain a predetermined ratio between the power currents of said armature circuits.

10. In combination, an alternating current generator having a pair of armature windings and a common excitation winding therefor, a bus comprising a pair of bus sections each connected to be energized from a different armature winding, a reactor connected between said bus sections, a balancing transformer connected between conductors of corresponding phase of said pair of armature windings, and load ratio control means connected to said bus for applying excitation to said balancing transformer so as to provide in the circuit of one of said armature windings a voltage component displaced in phase with the voltage of said armature winding.

11. In combination, an alternating current generator having a pair of armature windings and a common excitation winding therefor, a bus comprising a pair of bus sections each connected to be energized from a different armature winding, a reactor connected between said bus sections, a balancing transformer connected between conductors of corresponding phase of said pair of armature windings, and load ratio control means interconnecting said bus and said balancing transformer for applying excitation to said balancing transformer of such a character as to maintain a predetermined division of power current between said generator windings.

12. In combination, an alternating current generator having a pair of armature windings and a common excitation circuit therefor, a bus including a pair of bus sections, a reactor connected between said bus sections, a balancing transformer connected between conductors of corresponding phase of said pair of generator circuits, and load ratio control means energized from said bus for applying excitation to said balancing transformer so as to provide components of voltage in one of said generator circuits which are in-phase and in quadrature respectively with the voltage of said one of said armature windings.

13. In combination, a pair of alternating current generator circuits, a load circuit, means including an impedance interconnecting said generator circuits in parallel relation to energize said load circuit, a balancing transformer connected between conductors of corresponding phase of said generator circuits, load ratio control means for exciting said balancing transformer from a voltage of said bus which is in quadrature relation with the voltage of the associated generator circuits, and means responsive to a departure of the power currents of said generator circuits from a predetermined ratio for controlling said load ratio control means to restore said predetermined ratio.

14. In combination, a pair of alternating current generator circuits, a load circuit, means including an impedance interconnecting said generator circuits in parallel relation to energize said load circuit, a balancing transformer connected between conductors of corresponding phase of said generator circuits, quadrature load ratio control means and in-phase load ratio control means for jointly exciting said balancing transformer, and means responsive to a departure from a predetermined ratio of the power currents and quadrature currents of said generator circuits for simultaneously varying said load ratio control means to restore said predetermined ratio.

15. In combination, a double-winding polyphase alternating current generator, a bus comprising a plurality of bus sections, each of said generator windings being connected to energize a different bus section, impedance means connected between bus sections to which said generator windings are connected, a balancing transformer interconnecting corresponding phase conductors of each of the phases of said generator, polyphase load ratio control means comprising a polyphase transformer for each phase of said generator, ratio adjusters associated with each phase of each of said polyphase transformers, and means responsive to the currents in the respective generator circuits for simultaneously controlling said ratio adjusters to introduce in each of said balancing transformers a control voltage which is a resultant of a quadrature component of control voltage and an in-phase component of the associated generator voltage so as to maintain a predetermined ratio between the currents of said generator windings.

16. In combination, a double-winding polyphase alternating current generator, a bus comprising a plurality of bus sections, each of said generator windings being connected to energize a different bus section, impedance means connected between bus sections to which said generator windings are connected, a balancing transformer interconnecting corresponding phase conductors of each of the phases of said generator, polyphase load ratio control means comprising a polyphase transformer for each phase of said generator, ratio adjusters associated with certain phases less than the total number of phases of each of said polyphase transformers, and means responsive to the currents in the respective generator circuits for simultaneously controlling said ratio adjusters to introduce in each of said balancing transformers a control voltage which is a resultant of a quadrature component and an in-phase component of the associated generator voltage so as to maintain a predetermined ratio between the currents of said generator windings.

HOWARD O. STEPHENS.